Dec. 9, 1969 G. L. HASSER 3,483,331

ORIGINATING OFFICE ROUTING TRANSLATOR

Filed May 17, 1965 4 Sheets-Sheet 1

INVENTOR.
G. L. HASSER
BY [signature]
ATTORNEY

Dec. 9, 1969 G. L. HASSER 3,483,331

ORIGINATING OFFICE ROUTING TRANSLATOR

Filed May 17, 1965 4 Sheets-Sheet 2

United States Patent Office 3,483,331

Patented Dec. 9, 1969

3,483,331

ORIGINATING OFFICE ROUTING TRANSLATOR

George L. Hasser, Wayne, N.J., assignor to International Telephone and Telegraph Corporation, New York, N.Y., a corporation of Maryland Filed May 17, 1965, Ser. No. 456,300
Int. Cl. H04m 3/00
U.S. Cl. 179—18 18 Claims

ABSTRACT OF THE DISCLOSURE

The invention provides a programmed translator for routing calls through a national network. As each distant switching center is reached, application is made to the translator and data is then read out to direct the switches in that distant center. If the distant center encounters a link that is blocked, the translator drops back to release the partially established link and to try another programmed route (in a pre-established order of preference). After drop back, the translator reads out the data required to set up that route.

This invention relates to translators and more particularly to routing translators which are controlled responsive to the status of trunking facilities available to a switching network.

Switching networks are often adapted to extend communication paths over a selected one from among a plurality of alternative routes. In a normal condition, the path is extended over one of the routes which is selected as the most economical or efficient. If the preferred route becomes unavailable, other alternative routes are selected in an order of preference which insures a use of the best available route.

It is immaterial why the routes are available or unavailable. The routes could be unavailable because of busy conditions, natural disaster, national emergencies, or the like. The important thing is that traffic is rerouted whenever it is necessary to do so. Equally important, the traffic should be returned to normal routing when it is no longer necessary to reroute.

The switching network and trunking facilities may take any one of many forms. One exemplary system, actually built and tested, utilized a glass reed switching matrix to extend paths in an automatic telegraph system. However, the invention is equally applicable to telephone or other switching networks.

Accordingly, an object of the invention is to provide new and improved translators for routing and rerouting traffic through trunking facilities. In this connection, an object is to provide low cost translators of general utility for use in conjunction with virtually any kind of switching system. More particularly, an object is to provide a control circuit for maintaining switching capability despite the unavailability of some trunking facilities.

A further object is to provide low cost translators making maximum use of extremely reliable components.

Yet another object of the invention is to provide a communication system which will survive a partial destruction of the transmission facilities used by such system. More specifically, an object is to provide for the selection of the best available route with retrial of other routes if the selected route cannot be used. Furthermore, an object is to return traffic to a normal pattern when the facilities again become available.

In keeping with one aspect of the invention, these and other objects are accomplished through the use of a routing translator and selector controlled by a status assessment computer. The routing translator comprises a coordinate array of horizontal and vertical busses. Diodes are selectively connected across the intersections of such busses according to the switching and transmission facilities required to complete certain routes. This way, an interrogation potential may be applied to any horizontal bus to request routing information for a desired path between two end points. Potentials may be selectively applied to any vertical bus to inhibit the selection of any given path. If an interrogation potential is applied to a particular horizontal, and the preferred route is found to be inhibited, the circuit applying the interrogation signal automatically receives routing information for the next most preferred route. This way, routing information is read out if any path is available between the two end points, but the information that is read out is always provided in a given order of preference so that the best available route is selected.

The above mentioned and other features of this invention and the manner of obtaining them will become more apparent, and the invention itself will be best understood by reference to the following description of an embodiment of the invention taken in conjunction with the accompanying drawings, in which.

Figure 1:
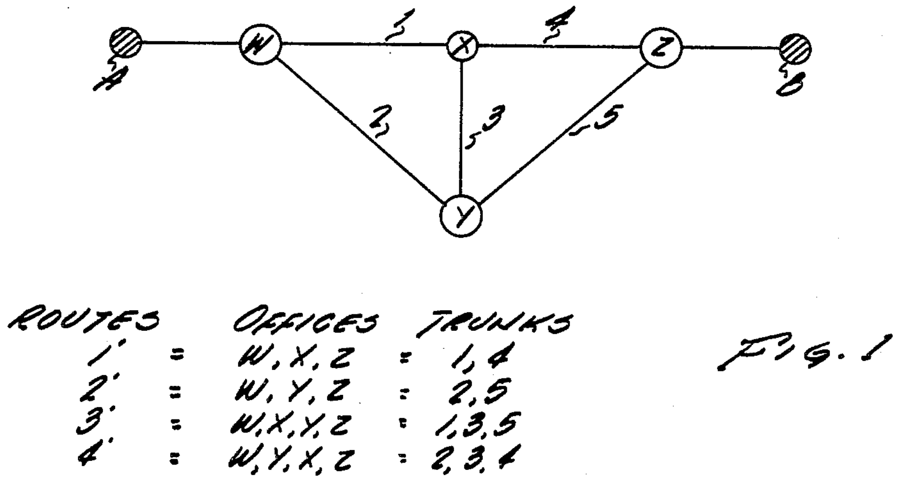
FIG. 1 is an exemplary layout of the transmission facilities in a simplified communication network requiring routing information together with a table identifying the possible routes through the network.

FIG. 1 shows an exemplary communication network including two end stations A, B and four central offices W, X, Y, Z interconnected by any suitable transmission facilities 1, 2, 3, 4, 5. The stations A, B are the end points of desired routes through the communication network. The routes may be extended over tandem connected ones of selected transmission facilities which may be trunk lines 1–5.

Thus, there are four possible routes between stations A and B, as set forth by the table in FIG. 1. The shortest and most desirable route (1′) includes offices W, X, Z and trunks 1, 4. The next most desirable route (2′) which is only slightly longer, includes offices W, Y, Z and trunk 2, 5. The third most desirable route (3′) is assumed to include offices W, X, Y, Z and trunks 1, 3, 5. The fourth and least desirable route (4′) is assumed to include offices W, X, Y, Z and trunks 2, 3, 4. Of course the network may be as large or as small as required to serve an area need—this layout is exemplary only.

Figure 2:
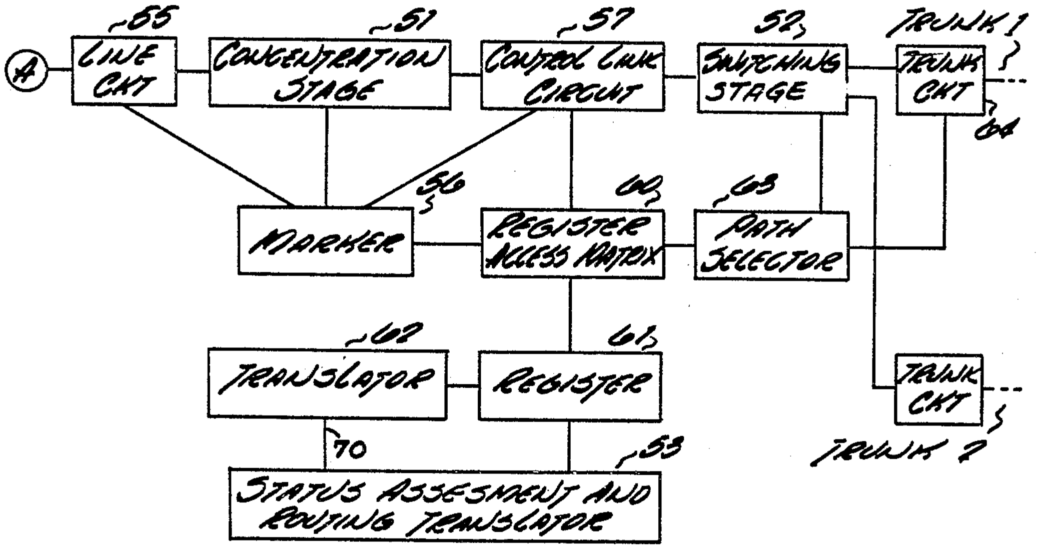
FIG. 2 is an exemplary block diagram showing how the status assessment and routing translator is connected into a station of the system of FIG. 1.

The problem is, therefore, to provide a decision making switching network in the originating office W which will select one from among these alternative routes in the order of preference 1′, 2′, 3′, 4′. An exemplary office incorporating circuits having this capability is shown in FIG. 2. For present purposes, it is assumed that this block diagram represents equipment located in office W, but it could be in any originating office.

The office W is here shown as comprising two switching stages 51, 52 designed to extend a connection from the end station A demanding service to either trunk 1 or trunk 2 depending upon a local route preference decision made in the status assessment and route translator circuit 53.

For present purposes, all of the circuits (except the status assessment and routing translator circuit 53) are considered to be old and well known. Those skilled in the art will readily recognize those known circuits which perform the indicated functions. It should be understood, however, that many of the inventive functions may be distributed throughout the known circuits without departing from the teaching of the invention. For example, some of the functions ascribed to circuit 53 may be performed in the register 61 and other functions may be performed in the translator 62, or elsewhere.

With this background, it is thought that the nature of the invention will be understood best by a description of how the equipment in FIG. 2 cooperates to extend a call.

The end station A is operated to demand service, as when a teleprinter is operated or a telephone hand set is removed from a hookswitch. Responsive thereto, line circuit 55 seizes a marker 56. The marker 56 selects an idle control link circuit 57 and operates the switching stage 51 to interconnect the line circuit 55 serving the demanding end station A and the selected control link 57. Then, the marker causes a switching device 60 (here called a "Register Access Matrix") to seize an idle register 61 and connect it to control link 57. The marker 56 drops out of the connection, and the register 61 signals station A, as by returning dial tone.

Responsive to dial tone, a calling subscriber sends a series of called end point selection signals in any convenient manner. For example, an ordinary telephone dial or key set may be manipulated. The resulting signals are then sent through line circuit 55, switching concentration stage 51, control link 57, and register access matrix 60 to register 61. The register stores these signals as they are received. For example, in a telephone system, these signals would represent the directory number of a called line.

When the register 61 completes the storage of enough information to identify the called office, it calls in a translator 62. If no status assessment or route selection is required, the translator merely identifies the equipment to be used in the connection. The register 61 then seizes a path selector circuit 63 and sends it the signals which identify the desired equipment. The path selector responds by selecting an idle channel of the indicated equipment, such as a trunk circuit 64. Then, the path selector 63 operates the switching matrix 52 to complete the path from control link 57, through trunk circuit 64 to trunk line 1. Finally, the register 61 sends path selection signals over trunk 1 to set switches in the various distant offices which are part of the selected route.

The operation described thus far is not too unlike the operation of many systems. However, the previous description has not considered the possibility of rerouting when the most desirable paths are unavailable. This is the function of the status assessment and routing translator 53 which is shown in detail in FIG. 3. To orient the reader, FIG. 3 shows the same register 61, translator 62, and interrogation access point 70 which appear in FIG. 2.

Figure 3:
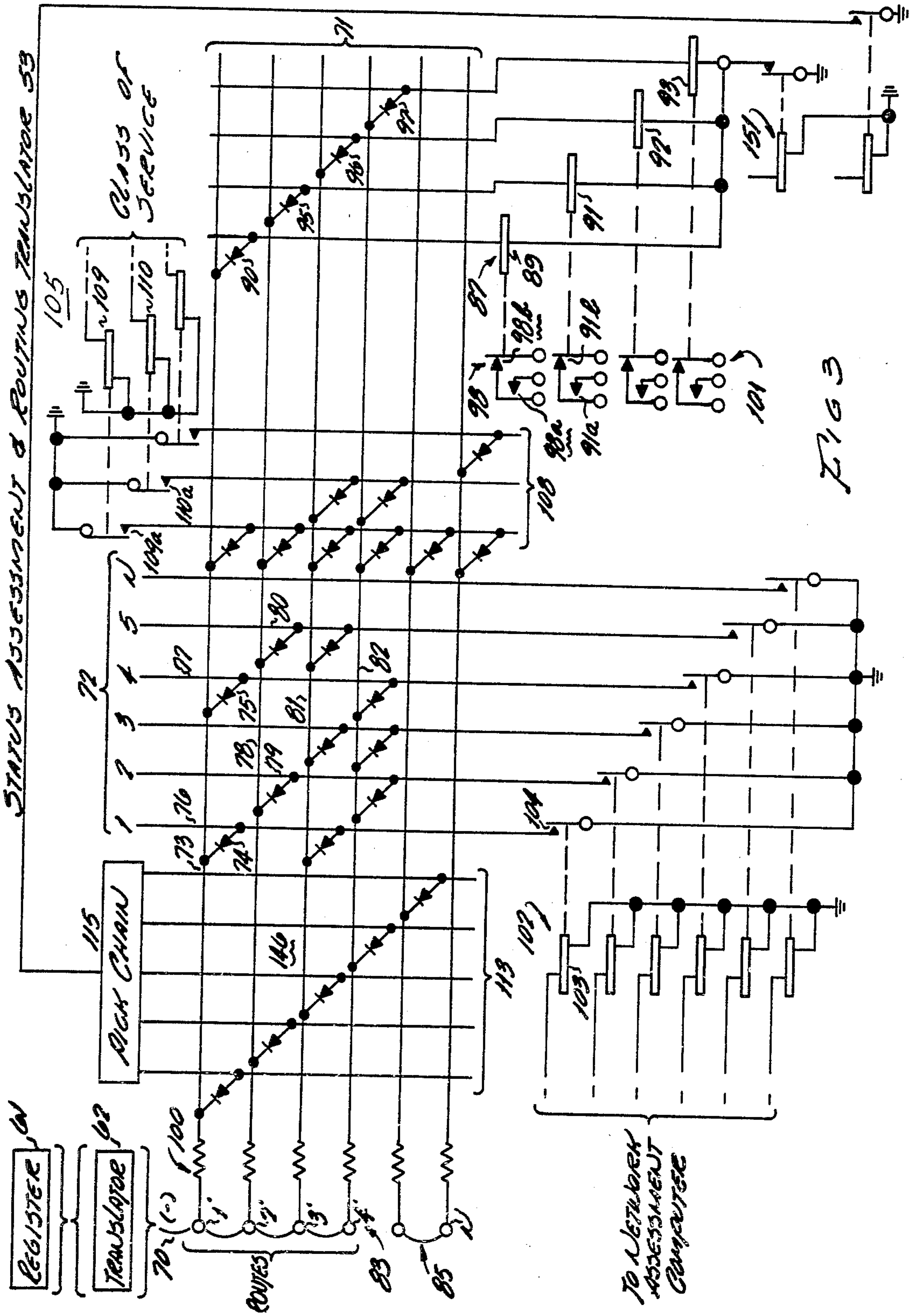
FIG. 3 is a schematic circuit diagram showing how the status assessment and routing translator is made.

The assessment circuit of FIG. 3 comprises a coordinate array of horizontal busses 71 and vertical busses (an exemplary five of which are shown at 72). The horizontal busses represent routes; the vertical busses represent transmission facilities required to complete the routes and provide means for inhibiting route selections. Diodes are selectively connected across the intersections of such busses according to the availability of certain routes. For example, the diode 74 is connected across the intersection of uppermost horizontal bus 73 wich represents the preferred route 1′ and the vertical bus 76 which represents the trunk 1.

A study of FIG. 1 discloses that the preferred route 1′ includes the trunks 1, 4. Thus, diodes 74, 75 connect the horizontal bus 73 to the first and fourth vertical busses 76, 77. In like manner, the second preference route 2′ includes trunks 2 and 5; therefore, the second horizontal bus 78 is diode connected to the second and fifth vertical busses 79, 80. An inspection and comparison of FIGS. 1 and 3 will disclose why the third horizontal bus 81 is connected to the first, third, and fifth verticals while the fourth horizontal bus 82 is connected to the second, third, and foutrh verticals.

Since each of the routes represented by the first four horizontals 73, 78, 81, 82 extends between the same two end points in the network of FIG. 1, each is the communication equivalent of the other; although, preference selection makes a difference as to which is to be used. For this reason, the inputs to all four of these busses are strapped together at 83. Other inputs, at 85, may also be strapped together according to their communication equivalency. The function which remains is to select between the routes 1′, 2′, 3′ and 4′ in a given order of preference.

As will become more apparent, preference is made by a pick chain of relays acting upon route relays 87. In greater detail, every horizontal is connected to an individually associated one of the route relays via an isolating diode. Thus, for example, the first route relay 89 is individually connected to the horizontal 73 via diode 90. In like manner, the relays 91, 92, 93 are connected to the horizontal busses 78, 81, 82 via the diodes 95, 96, 97, respectively. Since route 1′ is preferred over the other routes, horizontal 73 represents route 1′, and relay 89 is connected to horizontal 73. Therefore, the pick chain prefers relay 89 over relays 91, 92, 93. If the first preference route 1′ is not available, the second preference route 2′ relay 91 operates, and relays 92, 93 are inhibited by the pick chain.

Each of these route relays 87 controls associated contacts, such as 98, which enables the selection of a given route. Therefore, if relay 89 operates, for example, contacts **98*a* close a circuit to enable a selection of the route 1′ and contacts 98*b* break for supervisory purposes. This way, one of the route relays 87** has a preference over the other route relays, and one route has preference over the other routes.

Means are provided for interrogating the status assessment and routing translator circuit 53 to find a preferred route. In greater detail, the register 61 receives and stores subscriber sent station selection signals which identify the destination of a desired communication path (e.g. these signals may be the directory number of called station B, FIG. 1). Then the register 61 connects itself to the translator 62 which gives a read out in terms of equipment to be used. Here the read out is in the form of a negative potential applied from translator 62 to the bus 70, FIG. 3. By the strapping at 83, this negative potential is applied to horizontals representing all possible routes from the calling station A to the called station B. The resistors 100 provide a degree of isolation between the several horizontals.

If all four paths 1′, 2′, 3′, 4′, are available, a negative voltage appears on each of the horizontal buses 73, 78, 81, 82 and would feed through the diodes 90, 95, 96, 97 to the relays 89, 91, 92, 93, except that a pick chain 115 inhibits all except relay 89 in a manner explained below. When relay 89 operates contacts 98, a read out bus representing route 1′ is energized in FIG. 4.

Means are provided for inhibiting the selection of a preferred route if it is unavailable. More particularly, this means comprises the vertical busses 72 (FIG. 3) and a plurality of status assessment relays 102 having contacts in the circuits leading to the individual vertical busses.

The vertical busses 72 are numbered 1–5 to correspond to the trunks in FIG. 1. Thus, the availability of trunk 1 is indicated by potential on the vertical bus 1. For example, a zero potential on bus 76 (open contacts 104) means that trunk 1 is available. A ground potential (closed contacts 104) means that trunk 1 is not available. The letter "N" indicates that any number of trunks may be represented in a similar manner.

To enable or inhibit a selection of each route, the relays 102 are selectively operated or left unoperated by a network status assessment computer. One example of a suitable computer for use at this point is described in a copending patent application entitled "Network Status Intelligence Acquisition, Assessment and Communication," filed Mar. 17, 1965, Ser. No. 440,436, by J. W. Halina, L. B. Haigh, W. S. Litchman and assigned to the assignees of this invention, now U.S. Patent 3,411,140. If, for example, the trunk 1 is busy, destroyed or otherwise out of order the network status assessment computer operates the relay 103. This operation closes contacts 104 and applies ground to the vertical bus 76. The IR drops across resistors 100 are high enough to prevent the voltage on horizontals 78, 82 from falling to ground potential. However, the ground on bus 73 shunts the route relay 89 and prevents it from operating. If relay 89 cannot be operated, the route 1′ cannot be selected.

If it is assumed that all trunks (except trunk 1) are in service, none of the relays (other than relay 103) operates in group 102. Ground is not applied to any other of the vertical busses 72. The pick chain 115 operates relay 91 and route 2′ is preferred.

Obviously, the conditions signaled from the network status assessment computer can operate the relays 102 in any combination depending upon the existing circuit conditions. The operation or non-operation of these relays inhibit or enable the use of any particular trunks. An advantage is that the route selection is self-healing to the extent that the status assessment computer can follow changes in circuit conditions. The computer described by Halina et al. is completely self-healing.

A class of service marking may also inhibit route selection. The structure for performing this function includes a number of class of service relays 105 and vertical busses 108. More specifically, any suitable circuitry may be adapted to operate the class of service relays 105 according to the nature of the service granted to the calling subscriber. For example, if station A is not allowed to place calls outside of its office W, the line circuit 55 (FIG. 2) is marked to cause an operation of the class of service relay 109. This relay pulls its contacts 109*a* to mark all horizontal busses 71 via diodes connected to the first vertical bus in group 108. On the other hand, if station A is allowed to make a call only when the shortest routes 1′, 2′ are available, relay 110 operates to close its contacts 110*a* and thereby inhibit the routes 3′ and 4′ via the diodes connected to the second vertical bus in group 108. Any class of service may be provided in a similar manner.

Finally, the invention allows for the use of any suitable pick chain logic circuit 115 to override the normal preference and select any given route. For example, route 1′ might be the normally preferred route, but programming, busy override, or other collateral features might make it expedient to prefer route 2′.

Figure 4:
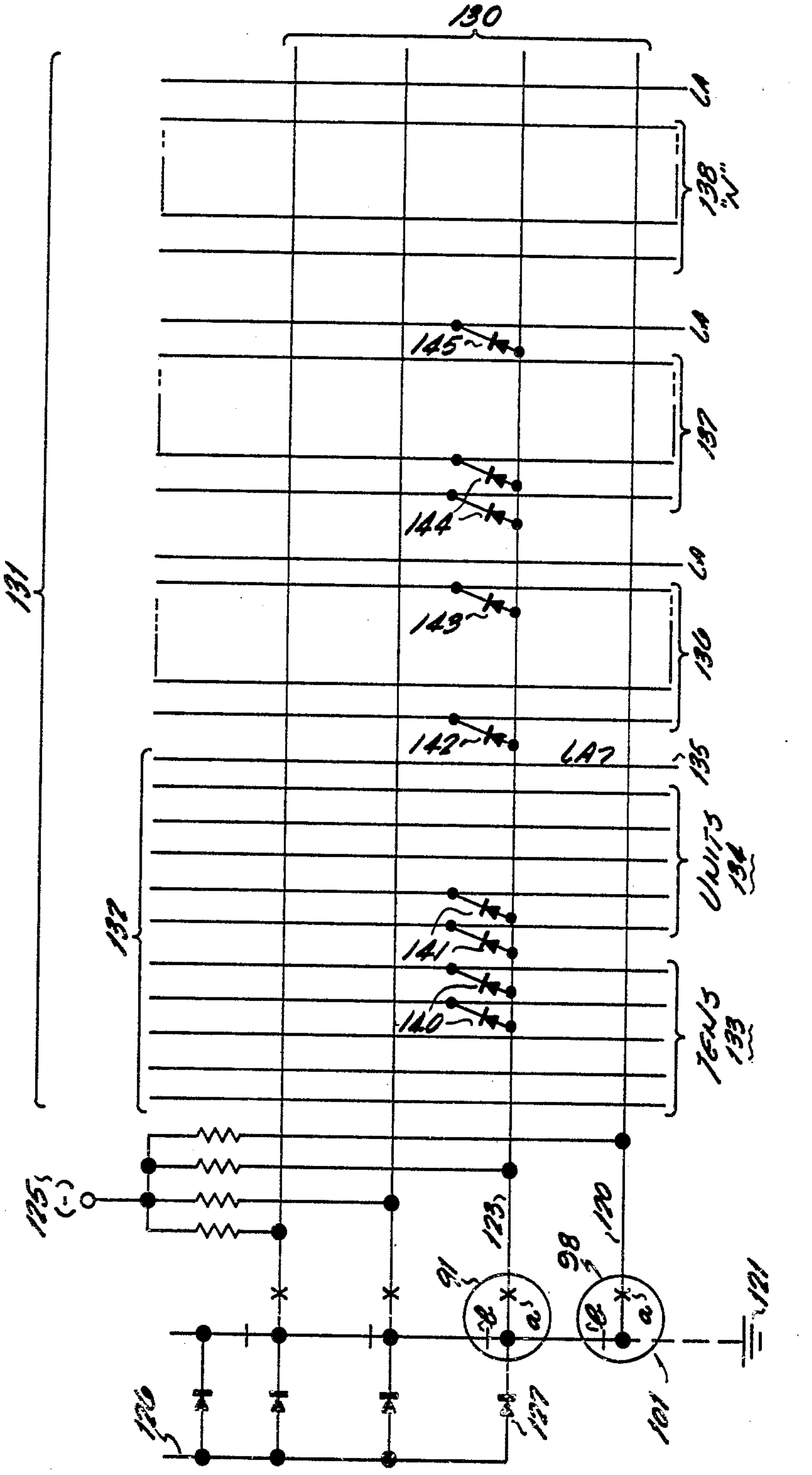
FIG. 4 shows a read out circuit controlled by the circuit of FIG. 3 and used to provide the signals which control the extension of a switch path.

FIG. 4 explains in detail how the route relay contact chain 101 (also shown in FIG. 3) accomplishes the preference selection functions. Contacts 98 in FIG. 4 are the same set of contacts 98 which are operated by relay 89 in FIG. 3. Each set of contacts in chain 101 comprises a set of make and a set of break contact springs designated *a*, and *b* respectively. If it is assumed that relay 89 operates, contacts 98*a* close to apply ground potential 121 to energize a horizontal bus 120 in a route read out circuit. Contacts 98*b* open to prevent the application of the ground potential 121 to any other horizontal bus in the read out circuit. If it is assumed that the relay 89 does not operate, but that the relay 91 does operate, contacts 91*a* close to apply the ground potential 121 to the horizontal bus 123. Contacts 98*a* are open so that the horizontal bus 120 is not energized. The contacts 91*b* open to prevent the energization of any other horizontal busses. This way only one horizontal bus is marked at any given time. Therefore, the contacts in chain 101 operate in a manner which insures that the available trunk with the highest preference is selected.

Means are provided to guard against double seizure. Normally, only one horizontal bus in FIG. 4 is energized at any given time. However, if two or more such busses are energized simultaneously, the negative potential 125 appears at output 126 to signal a double route detector with any suitable result. For example, if only contacts 98 operate all of the other *a* contacts in chain 101 are open, and there is no path from the potential source 125 to the conductor 126. If only the contacts 91 operate, the ground potential 121 is applied through break contacts 98*b* to clamp the cathode of a diode 127 to ground. This back biases the diode 127 and prevents it from conducting. Contacts 91*b* open to prevent potential 121 from reaching any other diodes. On the other hand, if trouble occurs and both of the contacts 98 and 91 operate simultaneously, the contact 98*b* is open so that no clamping potential can be applied from source 121 to the diode 127 and contacts 91*a* are closed to apply the negative battery 125 potential to diode 127. Thus, there is a circuit from source 125 through the contacts 91*a* and diode 127 to the output point 126. In like manner, a negative potential always appears at 126 if any two or more of the route selection relays operate simultaneously, but never appears if only one such relay operates at any given time.

The route read out circuit of FIG. 4 includes a matrix of horizontal and vertical busses 130, 131 with diodes selectively programmed across the intersections thereof to decode the routing information. The horizontal busses 130 represent the various routes. In this case, bus 120 represents route 1′ and the bus 123 represents the route 2′. These horizontal busses are selectively energized one at a time via contact chain 101 which is, in turn, under the control of the status assessment and routing translator circuit 53.

The vertical busses are grouped together to provide a plurality of route signature stages. The first group 132 is shown as having five "tens" busses 133 and five "units" busses 134 plus a last application bus 135. Each of the other groups 136–138 is identical to group 132, but a number of busses have been omitted from the drawing to conserve space. These busses facilitate a read out of different information during successive read out cycles, here called "applications."

First, it is assumed that trunk 1 (FIG. 1) is not available and that the network status assessment computer operated relay 103 (FIG. 3). Contacts 104 are closed and relays 89, 92 are inhibited by the pick chain 115 so that they cannot operate. Relays 91 and 93 are not inhibited and the preferred one can operate. Since relay 91 has a higher preference, contacts 91*a* (FIG. 4) close so that the ground potential 121 reaches the horizontal bus 123. Then, via busses 132, the translator 62 receives a read out of the equipment designation of the trunks in the selected route. To save time, the read out is here shown as being made in parallel on a two-out-of-five code basis. That is, the "tens" number of the route designation is the code "00011" supplied via diodes 140, and the "units" number is the code 11000 supplied via the diodes 141. The translator 62 utilizes this information to initiate the call.

As the call progresses from office to office, the register 61 sends switch control signals to each office, as required. For example, on route 2′ (FIG. 1), the call is extended to trunk 2, and office Y. Then the register 61 makes a second application to the route read out circuit of FIG. 4 for additional switch directing signals. This time the potention on the horizontal bus 123 is read out through the diodes 142, 143 to the register 61. The register decodes this read out and signals the office Y to cause it to seize the office Z. Then the register makes a third application for additional routing signals. During this third application, the routing information is read out through the diodes 144 and then sent to control the switches at the Office Z. The "N" at 138 indicates that the register may make any required number of applications for additional routing information.

Each application read out group of vertical busses has an associated extra or "last application" bus LA. If this bus is marked, the register knows that there is no need for making further application for additional routing information.

Since the use of route 2′ requires the register 61 to make three applications for the read out of additional routing information, the "LA" bus of the third application group 137 is marked via diode 145. Therefore, the register will not make a fourth application.

Means are provided for picking one route over another despite any preferences or status assessments which may occur. For example, the register 61 should be able to pick a route when it makes the described applications for each successive data read out. On other occasions, it may be necessary to program overriding route selections. This feature of the invention is disclosed in FIG. 3 by the hollow box 115 marked "PICK CHAIN." The circuitry required to complete the pick chain is shown in FIG. 5.

Figure 5:
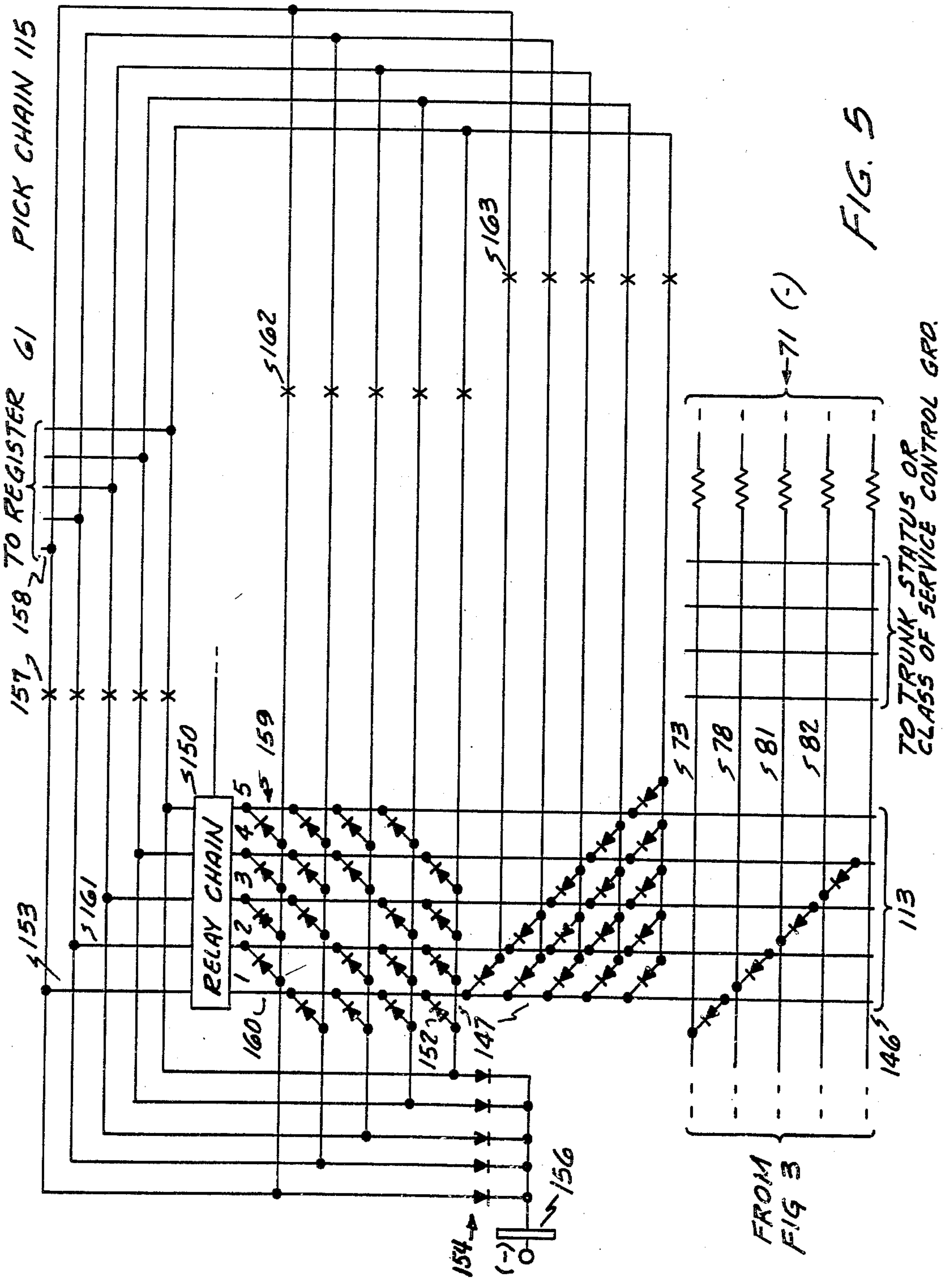
FIG. 5 is a schematic circuit diagram showing how a circuit is used to pick the route that is used.

FIGS. 3 and 5 show the same horizontal busses 71, vertical busses 113, and diode field 146, in addition, FIG. 5 also shows a pair of fields of diodes 147 for connecting a relay chain to the horizontal busses 71. An inspection will disclose how different selections of busses 71 are made by these two fields to provide any desired route selection preferences. The pick chain is enabled when the interrogation potential is applied to the horizontal busses 71 which have been programmed for specific routes. Each horizontal is connected to an input of the relay chain, 150 as shown in FIG. 5. Each of these inputs corresponds to an order of preference, that is, input 1 is the prime or preferred route, input 2 is the first alternate, etc. The relay chain 150 operates to the lowest number input in accordance with the status of the trunk groups programmed to make up the route. When operated, the relay chain inhibits all other available routes except the one corresponding to the lowest numbered input. In this manner, any route may be programmed by operation the relay chain in accordance with its preference of use. The relays 151 (FIG. 3) are arranged so that after the relay chain has operated, the route relays 87 are enabled to permit one of them to operate from the uninhibited interrogate potential. This way, the relay chain 150 picks the lowest numbered preferred route prior to enabling the route relays.

The remaining components in the pick circuit will be understood best by the following description of how it operates. The translator 62 (FIG. 3) responds to the routing signals received from station A by marking the horizontal busses 71 with a negative voltage. The negative potential will not pass through diodes connected with the polarity shown at 152. The potential on the marked busses does, however, pass over the busses 113 unaffected by the diode field 147, and cause the relay chain 150 to operate according to its built-in preference.

The relay chain then forwards a marking to the register which identifies the preferred route. For example, if the vertical busses 113 are marked in a particular manner, the relay chain 150 sends ground over conductor 153, through diode 154, and the winding of relay 156.

Relay 156 operates and closes its contacts 157. Then, ground is fed out over conductor 158 to the register 61 which responds by storing a signal that is the "signature" of the selected route (route 1′ under the present assumptions).

In addition, the ground on the conductor 153 passes through the diodes 159 and 146 (FIG. 3) to the horizontal busses 78, 81, 82. This ground inhibits the route relays 91, 92, 93. However, the route relay 89 is not inhibited because there is no diode at 160 (FIG. 5) for applying the ground on conductor 153 to the bus 73. This is because the bus 73 represents the selected route 1′. In like manner, a ground potential on the conductor 161 would enable the route relay 91 while inhibiting the route relays 89, 92, 93.

Each time that it makes application for additional routing information, the register 61 closes contacts 162 while applying a route signature ground to the conductor 158, assuming that such was the signature stored when the contacts 157 were closed. This ground passes through the diodes 159 and 146 to operate the route relay 89. It, in turn, operates contacts 98 and applies a potential to the route 1′ bus 120 in FIG. 4. This causes the read out of additional routing information on each succeeding set of vertical "application busses." The selection of the application busses is made in the register by contacts, not shown, connected to the top of busses 131.

If a busy signal is received from a distant office while the path is being extended, the register recognizes the busy signal as an indication that the selected route is blocked. Then, another route must be tried. The register does this by closing the contacts 163. The route signature stored in the register remains the same. Since this is assumed to be a ground potential on conductor 158 a potential feeds through contacts 163 and the diode field 147 to the relay chain 150. This time a ground is applied on the first lead connected to the relay chain 150. The chain will make a new route selection in accordance with the present trunk status information inhibiting the previously selected route and all lower numbered routes. A new route signature is returned via contacts 157 to the register by the operation of relay 156. By a further advancement of the relay chain, the route selection may be advanced should another blockage condition be encountered as the call progresses. The register continues to make application for routing information until it encounters a marking on an LA lead and thereby knows that the path is completed.

While the principles of the invention has been described above in connection with specific apparatus and applications, it is to be understood that this description is made only by way of example and not as a limitation on the scope of the invention.

I claim:

1. A status assessment and routing circuit comprising a coordinate array of horizontal and vertical busses, the busses extending in one coordinate direction representing individual routes through a communication network and the busses extending in the other coordinate direction representing transmission facilities required to complete the individual routes, means selectively connected across the intersections of said busses in accordance with the transmission facilities required to complete predetermined routes, means for selectively applying an interrogation voltage to at least one of the busses extending in said one coordinate direction to request routing information relative to the route represented by that bus, and means selectively responsive to conditions of unavailability for energizing the particular busses extending in the other coordinate direction which represent said unavailable facilities to inhibit a selection of the facilities which are then unavailable.

2. The circuit of claim 1 and means comprising a network status assessment computer for selectively applying said inhibiting energizations to said busses extending in said other direction in accordance with the instantaneous conditions of availability of said facilities at the time when the inhibition is applied.

3. The circuit of claim 1 and means comprising other of said busses extending in said other direction for inhibiting the selection of certain of said routes depending upon the class of service given to a station demanding a route through said communication network.

4. The circuit of claim 1 and means for simultaneously applying said interrogation voltage to all of the busses representing alternative routes between the same two end points, and means for selecting between said busses representing the alternative routes in a predetermined order of preference according to the order of preference between the alternative routes represented by said busses.

5. The circuit of claim 4 and means comprising other of said busses extending in said other direction for selecting a particular one of said alternative routes regardless of any previous preferences for other of said alternative routes.

6. The circuit of claim 4 and means for reading out the routing information required to complete the selected route through said communication network.

7. The circuit of claim 6 and means for guarding against double seizure of two or more routes through said communication network by inhibiting a simultaneous response to the interrogation voltage appearing on two or more of the busses extending in said one direction.

8. The circuit of claim 1 wherein said network comprises a plurality of switching centers, and a routing information read out circuit for supplying switch control data signals required to complete the selected route through the communication network, said read out circuit comprising a matrix of horizontal and vertical busses, the horizontal busses of said matrix representing individual ones of said routes through said communication network, the vertical busses of said matrix being grouped to provide individual route signature stages, means responsive to an application of a potential to any given horizontal bus for reading from the vertical busses connected to said given horizontal bus the data required to complete a connection over the route represented by said given horizontal bus, and means responsive to each advancement of said selected route from one switching center through said communication network to another switching center for applying to said read out circuit for another route signature.

9. The circuit of claim 8 and means in said read out circuit for signaling a read out of the last signature application required to complete any given route.

10. The circuit of claim 9 and means responsive to the receipt of a busy signal before the receipt of said last signature signal for causing said potential to shift from said given horizontal in said matrix to another horizontal representing an alternative route.

11. A status assessment and routing circuit comprising a pair of coordinate arrays of horizontal and vertical busses, each of said arrays comprising horizontal busses which represent individual routes through a communication network of switching centers, crosspoint means selectively connected across the intersections of said busses in accordance with the transmission facilities required to complete the routes represented by the horizontal busses to which said crosspoint means are connected, means associated with a first of said arrays for requesting routing information relative to the route represented by a horizontal bus, means responsive to changes in the network availability conditions for selectively energizing certain of said busses extending in the vertical direction to inhibit a selection of the facilities represented thereby, means responsive to selections made in said first array for energizing a corresponding horizontal bus in said second array to supply the switch control data signals required to complete the selected route through the communication network, the vertical busses of said second array being grouped to provide the individual route signature of the switching centers in a selected route, means responsive to an application of a potential to any given horizontal bus in said second array for reading from the vertical busses connected to said given horizontal bus the data required to complete a connection over the route represented by said given horizontal bus, and means responsive to each advancement of said selected route from one switching center through said communication network to another switching center for applying to said read out circuit for another route signature.

12. The circuit of claim 11 and means associated with said first array for applying an interrogation voltage to all of the horizontal busses representing alternative routes between the same two end points, means for selecting one of said interrogated busses representing the alternative route given preference according to an established order of preference between the alternative routes represented by said horizontal busses, means associated with the group of verticals in said second array representing the signature of the last switching center in a given route for signaling the read out of the last signature application required to complete any given route, and means responsive to the receipt of a busy signal from any of said switching centers in said preferred route before the receipt of sad last signature signal for causing said interrogation voltage to shift the read out from said one horizontal bus to another horizontal bus in said second array said shifted read out representing an alternative route.

13. The circuit of claim 11 and means comprising a network status assessment computer for selectively inhibiting certain of said busses to preclude the selection of said routes in accordance with the instantaneous availability of said facilities at the time when the inhibition is applied.

14. The circuit of claim 11 and means comprising said vertical busses for inhibiting the selection of certain of said routes depending upon the class of service given to a station demanding a route through said communication network.

15. The circuit of claim 11 and means comprising certain of said vertical busses for selecting a particular one of said alternative routes regardless of any previously established preferences for other said alternative routes.

16. A central switching office for use in a communication network of remotely located switching offices comprising register means for receiving and storing switch directing signals identifying the destination of a call, translator means in an originating office for indicating the equipment required to route said call through successive offices in said network according to said stored signals, means responsive to an extension of a call to each of the successive offices for reading additional routing information out of said translator in said originating office, and means for automatically re-routing calls through said network responsive to a status assessment of conditions in said network.

17. The circuit of claim 16 and a routing information read out circuit for supplying switch control data signals required to complete a selected route through the communication network, said read out circuit comprising a matrix of horizontal and vertical busses, said horizontal busses representing individual ones of alternative routes from a calling station through said communication network to a called station, said vertical busses being grouped to provide individual route signatures for extending calls through each switching office, means responsive to an application of a potential to any given horizontal bus for reading from the vertical busses connected to said given horizontal bus the data required to complete a connection over the route represented by said given horizontal bus, and means responsive to each advancement of said selected route from one switching office through said communication network to another switching office for applying to said read out circuit for another route signature.

18. The circuit of claim 17 and means responsive to the receipt of a busy signal before the completion of said call for causing said potential to shift from said given horizontal to another horizontal representing an alternative route, and means for signaling the read out of the last signature required to complete any given route.

References Cited

UNITED STATES PATENTS 3,342,945 9/1967 Hopper et al. ------ 179—18.21

WILLIAM C. COOPER, Primary Examiner